United States Patent
Neumann et al.

(10) Patent No.: US 12,475,358 B2
(45) Date of Patent: Nov. 18, 2025

(54) METHOD FOR ASCERTAINING AN OUTPUT SIGNAL WITH THE AID OF A MACHINE LEARNING SYSTEM

(71) Applicant: Robert Bosch GmbH, Stuttgart (DE)

(72) Inventors: Gerhard Neumann, Karlsruhe (DE); Michael Volpp, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1030 days.

(21) Appl. No.: 17/449,139

(22) Filed: Sep. 28, 2021

(65) Prior Publication Data
US 2022/0108152 A1   Apr. 7, 2022

(30) Foreign Application Priority Data
Oct. 2, 2020   (DE) .............................. 102020212514

(51) Int. Cl.
*G06N 3/04*   (2023.01)
*G06N 3/045*   (2023.01)
(Continued)

(52) U.S. Cl.
CPC .............. *G06N 3/045* (2023.01); *G06N 3/047* (2023.01); *G06N 3/08* (2013.01)

(58) Field of Classification Search
CPC ..................................................... G06N 3/045
See application file for complete search history.

(56) References Cited

U.S. PATENT DOCUMENTS

| | | | |
|---|---|---|---|
| 11,703,871 B2 * | 7/2023 | Arras ................. | G01C 21/3453 |
| | | | 701/25 |
| 2021/0097401 A1 * | 4/2021 | Ramalho ................ | G06N 3/045 |
| 2021/0286371 A1 * | 9/2021 | Choi .................... | G05D 1/0219 |

FOREIGN PATENT DOCUMENTS

WO   2019155065 A1   8/2019

OTHER PUBLICATIONS

Zhang, Jing, et al. "Multi-scale context aggregation for semantic segmentation of remote sensing images." Remote Sensing 12.4 (2020): 701. (Year: 2020).*

(Continued)

*Primary Examiner* — Hal Schnee
(74) *Attorney, Agent, or Firm* — NORTON ROSE FULBRIGHT US LLP

(57) ABSTRACT

A computer-implemented method for ascertaining, using a machine learning system, a first output signal characterizing a classification and/or a regression of a first input signal, and the output signal includes a first representation which characterizes an expected value of the classification or the regression, and a second representation, which characterizes a variance of the classification or regression. The method includes: ascertaining, using an encoder, latent representations each ascertained based on a second input signal and a second output signal that corresponds to the second input signal, and the second input signal and the second output signal characterize a context, the latent representation includes a first representation characterizing an expected value and a second representation characterizing a variance; ascertaining a third representation characterizing an accumulation of the first representations; ascertaining a fourth representation characterizing an accumulation of the second representations; ascertaining the first output signal using a decoder.

13 Claims, 8 Drawing Sheets

(51) Int. Cl.
*G06N 3/047* (2023.01)
*G06N 3/08* (2023.01)

(56) References Cited

OTHER PUBLICATIONS

Garnelo et al., "Conditional Neural Processes," Proceedings of the 35th International Conference on Machine Learning, Stockholm, Sweden, PMLR 80, 2018, pp. 1-10.
Edwards et al., "Towards a Neural Statistician," Published as a Conference Paper at ICLR, 2017, pp. 1-13.

* cited by examiner

METHOD FOR ASCERTAINING AN OUTPUT SIGNAL WITH THE AID OF A MACHINE LEARNING SYSTEM

CROSS REFERENCE

The present application claims the benefit under 35 U.S.C. § 119 of German Patent Application No. DE 102020212514.7 filed on Oct. 2, 2020, which is expressly incorporated herein by reference in its entirety.

FIELD

The present invention relates to a method for ascertaining an output signal with the aid of a machine learning system, a method for training the machine learning system, a training system, a computer program and a machine-readable memory medium.

BACKGROUND INFORMATION

Marta Garnelo et al., "Conditional Neural Processes," https://arxiv.org/abs/1807.01613v1, Jul. 4, 2018, describes a method for ascertaining an output signal with the aid of a conditional neural process.

SUMMARY

Many at least semi-automated devices or at least semi-automated systems use machine learning systems for an automated operation. For instance, a robot may use a machine learning system for classifying an environment of the robot, e.g., for classifying objects in the environment based on a camera image of the environment. Moreover, it is also possible that instead of a classification, the robot uses a machine learning system for a regression, for instance in order to ascertain a distance to the classified objects based on a camera image of the environment.

Machine learning systems are typically designed to ascertain a prediction with regard to the input image (such as the type and position of an object or a distance to the object) on the basis of an input signal (e.g., an input image). In the following text, a performance of a machine learning system may be understood to be a value that characterizes an average capability at which the machine learning system is able to correctly predict a desired result.

Modern machine learning systems are frequently based on neural networks because neural networks are typically able to achieve a very high performance for different technical problems. One disadvantage of neural networks is that they are often unable to ascertain a well-calibrated uncertainty in connection with their predictions. This means that neural networks frequently output a high certainty that the prediction is correct even for false or imprecise predictions.

An advantage of a machine learning system which is designed to carry out example embodiment of the present method is that the machine learning system is able to ascertain a well-calibrated uncertainty in connection with a prediction with the aid of the present method. In an advantageous manner, the method achieves this characteristic by combining features of Gaussian processes and neural networks. In comparison with other combinations of Gaussian processes and neural networks such as conditional neural processes, a machine learning system designed to carry out the method in accordance with an example embodiment of the present invention achieves a better performance.

In a first aspect, the present invention relates to a computer-implemented method for ascertaining a first output signal with the aid of a machine learning system, the first output signal characterizing a classification and/or a regression of a first input signal, and the output signal including a first representation that characterizes an expected value of the classification and/or the regression and including a second representation that characterizes a variance of the classification and/or the regression. In accordance with an example embodiment of the present invention, the method for ascertaining encompasses the following steps:

Ascertaining a multiplicity of latent representations with the aid of an encoder of the machine learning system, a latent representation of the multiplicity of latent representations being ascertained based on at least one second input signal and a second output signal that corresponds to the second input signal, and the second input signal and the second output signal characterize a context of the first input signal, and the latent representation includes a first representation and a second representation, the first representation characterizing an expected value and the second representation characterizing a variance;

Ascertaining a third representation based on the first representations of the latent representations of the multiplicity of latent representations, the third representation characterizing an accumulation of the first representations;

Ascertaining a fourth representation based on the second representations of the latent representations of the multiplicity of latent representations, the fourth representation characterizing an accumulation of the second representations;

Ascertaining the first output signal with the aid of a decoder of the machine learning system, the decoder ascertaining the first output signal based on the third representation and the fourth representation and the first input signal.

The present method may be understood to denote that a classification and/or regression of at least a first input signal is ascertained by the first output signal, the first output signal being ascertained not only based on the first input signal but also being ascertained in the context of at least one further second input signal and a second output signal corresponding to the second input signal. However, in particular, it is especially also possible to use as context multiple second input signals and correspondingly multiple second output signals that correspond therewith. The second input signal(s) may be considered to be in context with the first input signal in this instance.

A second output signal may be understood to denote that it characterizes a classification and/or regression of a corresponding second input signal. The context that is made available to the machine learning system may thus be understood to indicate to the machine learning system for certain input signals which output signal is correct or desired or may be accepted.

By considering second input signals and second output signals, considerably more information is supplied to the machine learning system in comparison with other machine learning systems that ascertain a first output signal solely on the basis of a first input signal. The second input signals and corresponding second output signals may thus be understood to be orientation points on the basis of which the machine learning system ascertains the first output signal for the first input signal.

Here, the term 'context' may be understood to be a relationship in which the second input signal(s) and the second output signals are related to the first input signal.

For example, it is possible that a multiplicity of second input signals characterizes a corresponding multiplicity of instants, while the second output signals characterize sampling points of an audio signal at the respective instants. The first input signal, for instance, may characterize an instant at which no sampling point exists and for which a sampling point is to be predicted by the machine learning system. The first input signal may then be ascertained by the machine learning system in the context of the second input signals and second output signals.

In a further example, it is possible that based on a video sequence of images and of objects detected in the images, it is to be determined in which direction the detected objects in the image will move in the future. In this instance the images of the video sequence or their recording instants may be understood to be the second input signals, and the positions of the objects may represent the respective second output signals. For instance, a future instant may be selected as the first input signal, and the first output signal may then be ascertained at the future instant and with the aid of the context (i.e. the second input signals and second output signals).

The context of the first and second input signals may be developed in a variety of ways. For instance, it is possible that the second input signals include pixels of an image, that is to say, parts of an image, whose pixel values are known, and the first input signal includes pixels of the image whose pixel values are not known. It is possible that in this case the machine learning system is set up to ascertain the first input signal, i.e. the unknown pixel values, based on the second input signals, i.e. the known pixels and pixel values.

More specifically, it is also possible that multiple first output signals are ascertained in connection with multiple first input signals based on the same context. In the example of the video sequence, for instance, it is possible that the positions of the objects at different future instants are able to be ascertained based on a same number of current instants.

In accordance with an example embodiment of the present invention, the first output signal may characterize an expected value as well as a variance of a regression of at least one real value. As an alternative, it is possible that the output signal is also able to characterize a classification as well as an uncertainty inherent in the classification. For instance, the first representation of the first output signal may include a vector that includes a multiplicity of logit values for a corresponding multiplicity of classes. The second representation may include a vector of real values, each of these real values characterizing a variance, i.e. an uncertainty, of one of the logit values.

The first input signals and second input signals may in particular be part of a sequence such as described in the above examples. In general, the first input signals and the second input signals may be understood to have been generated from a stochastic process.

As a result, the present method is capable of ascertaining a first output signal with regard to the first input signal as a function of second input signals that are in context with the first input signal and second output signals. This advantageously enables the present method to extract information not only from the first input signal but also from the second input signals which are in context with the first input signal and the second output signals.

It is possible that a first input signal and/or a second input signal include(s) at least parts of an image, in particular of an image ascertained with the aid of a sensor such as a camera sensor, LIDAR sensor, radar sensor, ultrasonic sensor or a thermal camera. Alternatively, the image may also be artificially generated with the aid of a computer-based method, e.g., based on a virtual world that was modeled on a computer, or based on a method for machine learning. Alternatively or additionally, it is possible that the first input signal and/or the second input signal include(s) at least portions of an audio signal, in particular of an audio signal ascertained by a microphone. It is alternatively possible that the audio signal is artificially generated, e.g., by a digital composition with the aid of a computer or by a machine learning method. Alternatively or additionally, it is possible that the first input signal and/or the second input signal include(s) sensor recordings of sensors of a machine, in particular of sensors that ascertain a power consumption and/or voltage and/or a rate of rotation and/or a speed and/or a temperature and/or a pressure and/or a force.

In general, a representation may be understood to be a singularity or a multiplicity of numerical values. More specifically, a representation may be a scalar, a vector, a matrix, or a tensor. It is also possible that a representation is made up of a multiplicity of scalars and/or a multiplicity of vectors and/or a multiplicity of matrices and/or a multiplicity of tensors. A latent representation, for instance, includes a first and a second representation.

A latent representation may be understood to denote that it characterizes an item of information that is includes in a second input signal and a second output signal that corresponds to the second input signal. This item of information may be understood in such a way that it at least partially characterizes the context. The form of the latent representation is able to be determined by the encoder. For example, it is possible that the first representations and second representations are a vector or a tensor in each case.

The third and fourth representation may be understood in such a way that both representations jointly characterize a context representation, that is to say, accumulated information of the context.

The encoder of the machine learning system may be understood to denote that it ascertains a latent representation for a second input signal and a second output signal in each case.

An advantage in comparison with other context-based machine learning systems is that the latent representations by the method may be understood as originating from a random variable. This makes it possible to express a form of uncertainty about the precise values of the latent representations. For instance, a second representation of a latent representation may characterize a high variance. This may be understood to denote that the encoder is uncertain of the precise latent representation for a second input signal and a second output signal.

The consideration of uncertainties allows for a considerably better accumulation of the latent representations than in conventional methods. The reason is that based on the ascertained uncertainty, a weighting of the ascertained latent representations is able to be performed in order to ascertain the third and the fourth representation, i.e. the context representation. In an advantageous manner, latent representations that characterize a high variance and thus a high uncertainty are thereby able not to be taken into account in the accumulation or to be considered only at a low weighting. The context representation then includes considerably more information. The inventors were able to discover that the described method leads to an improvement in the performance of the machine learning method.

It is furthermore possible that the fourth representation is ascertained according to a first formula $$\sigma_z^2 = \left[(\sigma_0^2)^\ominus + \sum_i (\sigma_i^2)^\ominus\right]^\ominus$$

where $\sigma_z^2$ is the fourth representation, $\sigma_0^2$ is an a priori assumption regarding the fourth representation, $\sigma_i^2$ is a second representation, ascertained by the encoder, of a latent representation of the $i^{th}$ input signal and the $i^{th}$ output signal of the multiplicity of second input signals and second output signals, and $\ominus$ indicates an elementwise reciprocal value.

An elementwise reciprocal value may be understood to denote that every value in a representation is switched for its reciprocal value.

The first formula may furthermore be understood to denote that the elementwise reciprocal values of the second representation are ascertained to start with, the elementwise reciprocal values are summed up, an a priori representation is added to the sum and the elementwise reciprocal value is ascertained again from the result.

The ascertainment of the fourth representation according to the first formula makes it possible for the accumulation of the second representations to be based on an uncertainty that is characterized by the second representations. In an advantageous manner, second representations that characterize a high uncertainty are then able to be taken into account to a lesser degree than second representations that characterize a high certainty.

Another advantage of an ascertainment of the fourth representation according to the first formula is that in addition to the ascertained second representations, a prior knowledge, that is to say, an a priori representation with regard to the fourth representation, is able to be incorporated into the ascertainment of the fourth representation. This leads to an improvement in the fourth representation because further prior knowledge is able to be introduced into the prediction of the machine learning system. This improvement thus leads to an improvement in the context representation, and thus to an improvement in the performance in the machine learning system.

It is furthermore possible that the third representation is ascertained according to a second formula $$\mu_z = \mu_0 + \sigma_z^2 \odot \sum_i (\mu_i - \mu_0) \oslash (\sigma_i^2)$$

where $\mu_z$ is the third representation, $\mu_0$ is an a priori assumption regarding the third representation, $\mu_i$ is a first representation, ascertained by the encoder, of a latent representation of the $i^{th}$ input signal and the $i^{th}$ output signal of the multiplicity of second input signals and second output signals, $\sigma_z^2$ is the third representation, $\sigma_i^2$ is a second representation, ascertained by the encoder, of a latent representation of the $i^{th}$ input signal and the $i^{th}$ output signal of the multiplicity of second input signals and second output signals, $\odot$ indicates an elementwise multiplication, and $\oslash$ indicates an elementwise division.

The second formula may be understood to denote that a weighted sum of the first representations of the latent representations is ascertained, the second representations being used as weighting factors. In addition, an a priori assumption, that is to say, a prior assumption, regarding the third value is added to the sum in order to ascertain the third representation.

The ascertainment of the fourth representation according to the second formula allows the accumulation of the first representations to be based on an uncertainty that is characterized by the second representations. This advantageously makes it possible to take first representations that characterize a high uncertainty into account to a lesser degree than first representations that characterize a high certainty.

Another advantage of an ascertainment of the third representation according to the mentioned formula is that in addition to the ascertained first representations, a prior knowledge, i.e., an a priori representation with regard to the third representation, is able to be incorporated into the ascertainment of the third representation. This leads to an improvement in the third representation because further prior knowledge is able to be introduced into the prediction of the machine learning system. This improvement thus leads to an improvement in the context representation and consequently to an improvement in the performance of the machine learning system.

It is furthermore possible that the encoder includes a neural network which is designed to ascertain the first representations and second representations of the latent representations of the multiplicity of latent representations based on the multiplicity of second input signals and second output signals.

This offers the advantage that a neural network is better able to determine the first and second representations than other methods from the field of machine learning. This further improves the performance of the machine learning system.

As an alternative, it is possible that the encoder includes a first neural network which is designed to ascertain the first representations of the latent representations of the multiplicity of latent representations based on the multiplicity of second input signals, and the encoder includes a second neural network which is designed to ascertain the second representations of the latent representations of the multiplicity of latent representations based on the multiplicity of second input signals.

To their surprise, the inventors were able to determine that the described use of two separate neural networks for ascertaining the first and/or second representations of a latent representation leads to a better performance of the machine learning system.

In addition, it is possible that the decoder includes a neural network which is designed to ascertain the first output signal based on the third representation and the fourth representation and the first input signal, the neural network in particular being designed to ascertain the first and second representation.

This has the advantage that a neural network is better able to determine the first and second representations of the output signal than other methods from the field of machine learning. This further improves the performance of the machine learning system.

As an alternative, it is possible that the decoder includes a first neural network which is designed to ascertain the first representation of the first output signal based on the third representation and the first input signal, and the decoder includes a second neural network which is designed to ascertain the second representation of the first output signal based on the fourth representation and the first input signal.

To their surprise, the inventors were able to determine that the described use of two separate neural networks for the ascertainment of the first and/or second representation of the first output signal leads to an improved performance of the machine learning system.

It is furthermore possible that the present method for ascertaining the output signal includes training of the machine learning system, the training encompassing the following steps:

Ascertaining a multiplicity of training input signals, which are in context with one another, and a corresponding training output signal is allocated to each training input signal;

Dividing the multiplicity of training input signals and training output signals into a multiplicity of second training input signals and corresponding second training output signals and into at least one first training input signal and a corresponding first training output signal;

Ascertaining a third representation and a fourth representation based on the multiplicity of second training input signals and the second training output signals;

Ascertaining a predicted output signal for the at least one first training input signal with the aid of the decoder of the machine learning system and on the basis of the ascertained third representation and the ascertained fourth representation and the first training input signal;

Determining a loss value, which characterizes a difference between the predicted output signal and the first training output signal;

Ascertaining a gradient of a multiplicity of parameters of the encoder with regard to the loss value;

Varying the multiplicity of parameters based on the ascertained gradient.

The multiplicity of training input signals, for instance, may include input signals from a sequence such as the individual images of a video and/or sampling points of an audio signal. The training output signals may characterize corresponding annotations of the input signals of the sequence such as a position of an object in an image.

Preferably, the multiplicity of the training input signal may be randomly divided into the multiplicity of second training input signals and the multiplicity of first training input signals. However, it is also possible to use a predefined division. For instance, it is possible that the machine learning system is to be used for predicting a continuation of a sequence of second input signals and second output signals. In this case it may be advantageous to subdivide a sequence of training input signals in such a way that a first part of the sequence is used as a multiplicity of second training input signals and the remaining training input signals are used as a multiplicity of first training input signals.

Since a training output signal is allocated to a training input signal, the division of the training input signals may also be understood as a division of the training output signals.

The described steps of the training method are preferably iteratively repeated in order to train the machine learning system. In every training situation, preferably new training input signals and new training output signals are able to be ascertained for the machine learning system and the machine learning system be trained in this way with the aid of a multiplicity of input signals and output signals.

Preferably, the training input signals and the corresponding training output may be supplied by a computer-implemented database from where corresponding training input signals and training output signals are randomly called up for each training iteration.

The training input signals and corresponding training output signals may jointly also be understood to be training data.

Since the machine learning system may be understood as a linkage of differentiable functions, the backpropagation algorithm is able to be used for training the machine learning system in order to ascertain the gradient. Based on the backpropagation algorithm, the machine learning system is preferably able to be trained via a gradient descent method.

In contrast to training methods that are based on a variational inference, the described training method may be considered to be deterministic. This characteristic shortens the training time because there is no need to ascertain different model parameters of the machine learning system for the same training data, which is required in a training based on a variational inference, for instance. The reduced training time makes it possible for the machine learning system to be trained by more training data within a fixed time period. Conversely, the performance of the machine learning method is therefore able to be improved by the training method.

In particular, it is possible that the loss value is ascertained based on a loss function that characterizes a probability density function or a logarithmized probability density function of a normal distribution, a first representation of the predicted output signal ascertained by the decoder being used as an expected value of the probability density function and a second representation of the predicted output signal ascertained by the decoder being used as a variance or a covariance matrix of the probability density function.

Although a possible correlation between elements of a sequence of first training input signals is disregarded in this special form of the loss function, the inventors discovered to their surprise that the performance of the machine learning system when training with this loss function is advantageously able to be improved nevertheless.

In particular, it is possible that the machine learning system is trained using a multiplicity of first training input signals and training output signals, the loss value being ascertained according to a third formula $$l(y_{1:m} \mid x_{1:m}, \mu_z, \sigma_z^2) = -\sum_i \mathcal{N}(y_i \mid dec(x_i, \mu_z), dec(x_i, \sigma_z^2))$$

where $x_{1:m}$ is the multiplicity of first training input signals, $y_{1:m}$ are the training output signals allocated to the first training input signals in each case, $\mathcal{N}$ is a probability density function of a normal distribution, $dec(x_i, \mu_z)$ is a first representation of the predicted output signal ascertained with the aid of the decoder, $dec(x_i, \sigma_z^2)$ is a second representation of the predicted output signal ascertained with the aid of the decoder, the ascertained first representation being used as an expected value of the probability density function, and the ascertained second representation being used as a variance or a covariance matrix of the probability density function.

$x_{1:m}$ may be understood to be a multiplicity of first training input signals, and $y_{1:m}$ as a multiplicity of first training output signals corresponding to the first training input signals, m may be understood to be a number of first training input signals or of first training output signals, $x_i$ may be understood to be the $i^{th}$ element of the multiplicity of first training input signals, and $y_i$ to be the first training output signal corresponding to $x_i$.

In the event that only one first training input signal $x_1$ and a corresponding first training output signal $y_i$ are used, then an identical loss function is able to be used, the sum in the third formula being omitted.

The advantage of the ascertainment of the loss value according to the third formula is that the machine learning system is able to be trained using a different number of first training input signals and/or second training signals in each training iteration. This makes the machine learning system robust with regard to a different number of second input signals for which the machine learning system is to ascertain a context representation at an inference time. This enhances the performance of the machine learning system.

Below, example embodiments of the present invention will be described in greater detail with reference to the figures.

DETAILED DESCRIPTION OF EXAMPLE EMBODIMENTS

Figure 1:
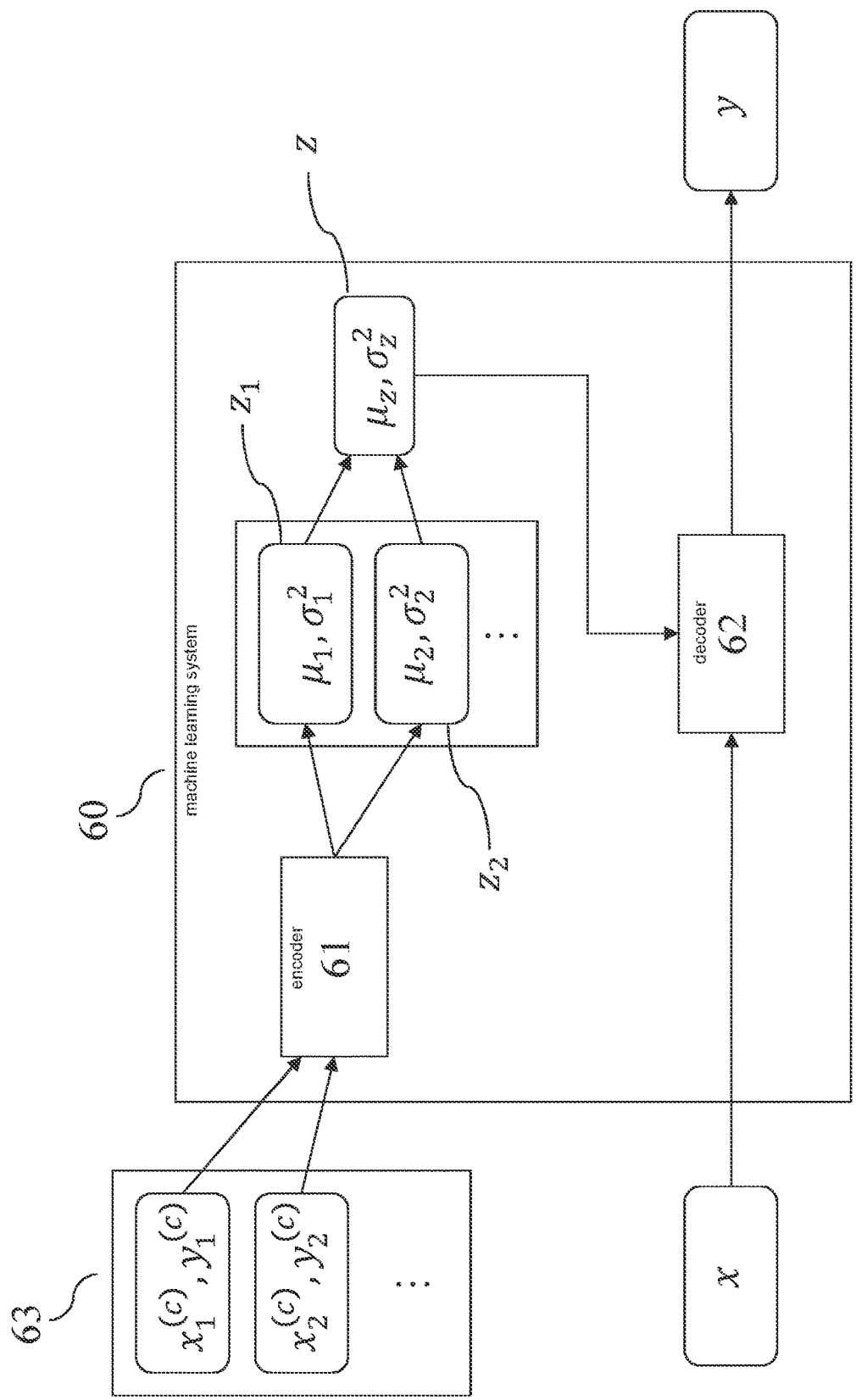
FIG. 1 schematically, the structure of a machine learning system, in accordance with an example embodiment of the present invention.

FIG. 1 shows a machine learning system (60) which is designed to ascertain a first output signal (y) based on a multiplicity (63) of second input signals $(x_1^{(c)}, x_2^{(c)})$ and second output signals $(y_1^{(c)}, y_2^{(c)})$ allocated to the second input signals, as well as a first input signal (x).

The second output signals $(y_1^{(c)}, y_2^{(c)})$ may be understood as annotations that are allocated to the second input signals $(x_1^{(c)}, x_2^{(c)})$. A second output signal $(y_1^{(c)}, y_2^{(c)})$ may be allocated to a second input signal $(x_1^{(c)}, x_2^{(c)})$, for instance by a person. Alternatively or additionally, it is possible that a second output signal $(y_1^{(c)}, y_2^{(c)})$ characterizes a first prediction of a second input signal $(x_1^{(c)}, x_2^{(c)})$ by the machine learning system (60), the first prediction preceding the ascertainment of the first output signal (y).

The first input signal (x) and/or the second input signals $(x_1^{(c)}, x_2^{(c)})$ and/or the second output signals $(y_1^{(c)}, y_2^{(c)})$ may particularly include numerical values or be made up of such, the numerical values possibly being present in the form of scalars, vectors, matrices or tensors.

The machine learning system receives the multiplicity (63) of second input signals $(x_1^{(c)}, x_2^{(c)})$ as well as second output signals $(y_1^{(c)}, y_2^{(c)})$ allocated to the second input signals in an encoder (61). The encoder (61) is preferably designed to ascertain for each second input signal $(x_1^{(c)}, x_2^{(c)})$ and the second output signal $(y_1^{(c)}, y_2^{(c)})$ corresponding to the second input signal a latent representation $(z_1, z_2)$, the latent representation encompassing a first representation $(\mu_1, \mu_2)$ which characterizes an expected value, and a second representation $(\sigma_1^2, \sigma_2^2)$ which characterizes a variance.

The encoder (61) preferably includes two neural networks, a first neural network of the encoder (61) being designed to ascertain a first representation $(\mu_1, \mu_2)$ based on a second input signal $(x_1^{(c)}, x_2^{(c)})$ and a second output signal $(y_1^{(c)}, y_2^{(c)})$, and a second neural network of the encoder (61) being designed to ascertain a second representation $(\sigma_1^2, \sigma_2^2)$ based on the second input signal $(x_1^{(c)}, x_2^{(c)})$ and the second output signal $(y_1^{(c)}, y_2^{(c)})$.

To process a second input signal $(x_1^{(c)}, x_2^{(c)})$ and a corresponding second output signal $(y_1^{(c)}, y_2^{(c)})$, the numerical values are able to be concatenated to form a vector, for example, which is then able to be handed over to the encoder (61). As an alternative, it is also possible that the neural networks of the decoder (61) are designed in such a way that the neural networks have two inputs in each case and the second input signal $(x_1^{(c)}, x_2^{(c)})$ and the corresponding second output signal $(y_1^{(c)}, y_2^{(c)})$ are able to be handed over separately via the two inputs.

The latent representations $(z_1, z_2)$ are accumulated to form a context representation (z), the context representation (z) including a third representation $(\mu_z)$ which characterizes an expected value of the accumulation, and it includes a fourth representation $(\sigma_z^2)$ which characterizes a variance of the accumulation. Preferably, the third representation $(\mu_z)$ is ascertained according to the formula $$\mu_z = \mu_0 + \sigma_z^2 \odot \sum_i (\mu_i - \mu_0) \oslash (\sigma_i^2)$$

and the fourth representation $(\sigma_z^2)$ is ascertained according to the formula $$\sigma_z^2 = \left[ (\sigma_0^2)^\ominus + \sum_i (\sigma_i^2)^\ominus \right]^\ominus$$

where $\mu_0$ is an a priori assumption about the third representation, $\sigma_0^2$ is an a priori assumption about the fourth representation, $\mu_i$ is a first representation of a latent representation ascertained by the encoder (61), $\sigma_z^2$ is the third representation, $\sigma_i^2$ is a second representation, ascertained by the encoder (61), of a latent representation, $\odot$ indicates an elementwise multiplication, $\ominus$ indicates an elementwise inversion of a representation, and $\oslash$ indicates an elementwise division of second representations.

The third representation $(\mu_z)$ and the fourth representation $(\sigma_z^2)$ may be understood to denote a context representation (z).

A zero element may preferably be selected as an a priori assumption for the third representation $(\mu_z)$. If the third representation $(\mu_z)$ is a scalar, then the zero element may have the zero value. In the event that the third representation ($\mu_z$) is a vector, then the zero element may be the zero vector, and for third representations ($\mu_z$) in the form of matrices and tensors, the zero element may be a matrix and/or a tensor which is entirely filled with zeroes.

A unit element may preferably be selected as an a priori assumption for the fourth representation ($\sigma_z^2$). If the fourth representation ($\sigma_z^2$) is a scalar, then the unit element may be the value of zero. In the event that the fourth representation ($\sigma_z^2$) is a vector, then the unit element may be the unit vector, and for the fourth representations ($\sigma_z^2$) in the form of matrices or tensors, the unit element may be a matrix or a tensor which is entirely filled with ones.

The third representation ($\mu_z$) and the fourth representation ($\sigma_z^2$) are preferably of the same dimensionality. This may be understood to mean that the a priori assumption of the context representation (z) is a standard normal distribution, possibly a multivariate standard normal distribution.

The context representation (z) and the first input signal (x) are then handed over to a decoder (62) of the machine learning system (60). The decoder (62) is set up to ascertain a first output signal (y) from the first input signal (x) and the context representation (z). The first output signal (y) includes a first representation which characterizes an expected value of a prediction of the machine learning system (60) with regard to the first input signal (x), and it includes a second representation, which characterizes a variance of the prediction. This may be understood to mean that the machine learning system (60) supplies a prediction which has an inherent uncertainty by the first output signal (y). The prediction may characterize a classification of the first input signal (x). Alternatively or additionally, it is possible that the prediction characterizes a regression of a real value, a real vector, a real matrix or a real tensor.

Preferably, the first representation and the second representation of the first output signal (y) have the same dimensionality as the second output signal ($y_1^{(c)}, y_2^{(c)}$).

The decoder (62) preferably includes two neural networks, a first neural network of the decoder (62) ascertaining the first representation of the first output signal (y), and a second neural network of the decoder ascertaining the second representation of the output signal (y).

To process the first input signal (x) and the context representation (z), the numerical values encompassed by the first input signal (x) and the context representation (z) are able to be concatenated and the concatenation may be conveyed to the neural networks of the decoder (62). Alternatively, it is also possible that the neural networks of the decoder (62) have a separate input for the first input signal (x) and the context representation (z) in each case.

In further embodiments (not shown), it is possible that the machine learning system (60) ascertains a first output signal (y) for a multiplicity of first input signals (x). This may be understood to mean that the machine learning system (60) is able to process a batch of first input signals (x).

Figure 2:
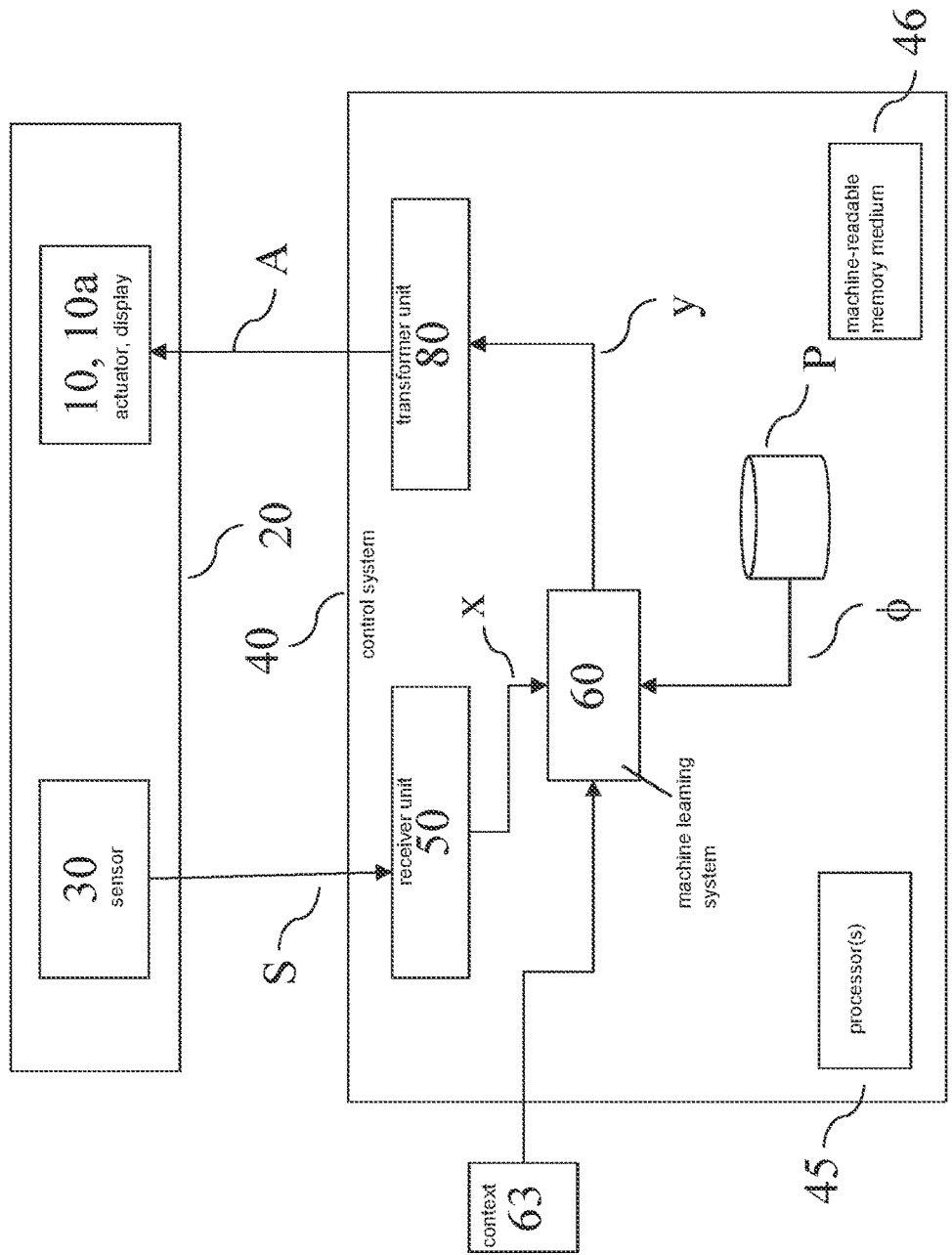
FIG. 2 schematically, a structure of a control system for actuating an actuator according to an output signal of the machine learning system, in accordance with an example embodiment of the present invention.

FIG. 2 shows an actuator (10) in its environment (20) in an interaction with a control system (40), the control system (40) including the machine learning system (60), and the actuator (10) being controlled according to at least one first output signal (y) of the machine learning system (60).

At preferably regular time intervals, the environment (20) is acquired in a sensor (30), in particular an imaging senor such as a camera sensor, which may also be provided as a plurality of sensors such as a stereo camera. The sensor signal (S)—or a separate sensor signal (S) in each case if multiple sensors are involved—of the sensor (30) is forwarded to the control system (40). The control system (40) thus receives a sequence of sensor signals (S). From that, the control system (40) ascertains actuation signals (A), which are transmitted to the actuator (10).

The control system (40) receives the sequence of sensor signals (S) from the sensor (30) in an optional receiver unit (50), which converts the sequence of sensor signals (S) into a sequence of first input signals (x) (alternatively, a direct adoption of the respective sensor signal (S) it is also possible). The first input signal (x), for instance, may be a section or a further processing of the sensor signal (S). In other words, the first input signal (x) is ascertained as a function of the sensor signal (S). The sequence of first input signals (x) is conveyed to the machine learning system (60). In addition, a multiplicity (63) of second input signals and second output signals is conveyed to the machine learning system (60). The multiplicity (63) may be understood as a context (63) of the first input signals (x).

The machine learning system (60) is preferably parameterized by parameters ($\phi$) which are stored in a parameter memory (P) and are supplied by the parameter memory.

The machine learning system (60) ascertains first output signals (y) from the input signals (x) and from the context (63). The output signals (y) are forwarded to an optional transformer unit (80), which ascertains actuation signals (A) therefrom which are conveyed to the actuator (10) for a corresponding actuation of the actuator (10).

The actuator (10) receives the actuation signals (A), is actuated accordingly and carries out a corresponding action. The actuator (10) may include a (not necessarily constructively integrated) actuation logic, which ascertains a second actuation signal from the actuation signal (A) which will then be used to actuate the actuator (10).

In further embodiments, the control system (40) includes the sensor (30). In still further embodiments, the control system (40) alternatively or additionally also includes the actuator (10).

In further preferred embodiments, the control system (40) includes at least one processor (45) and at least one machine-readable memory medium (46) on which instructions are stored that induce the control system (40) to carry out the method according to the present invention when the instructions are executed on the at least one processor (45).

In alternative embodiments, a display unit (10a) is provided as an alternative or in addition to the actuator (10).

Figure 3:
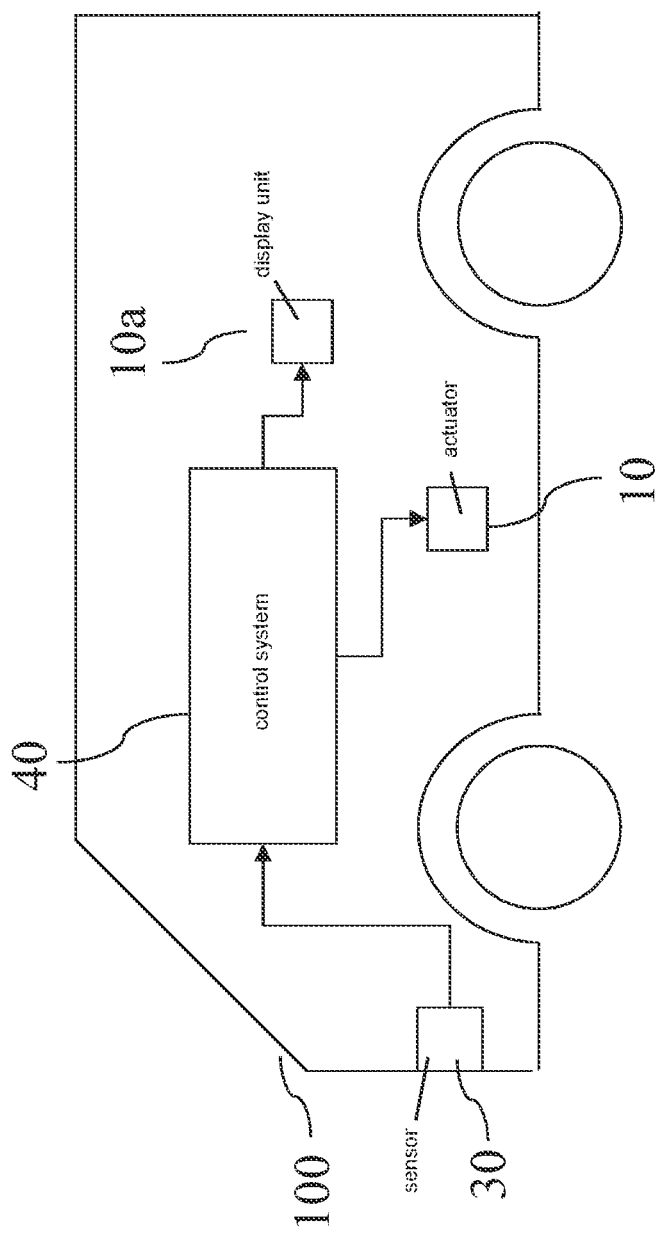
FIG. 3 schematically, an exemplary embodiment for the control of an at least semi-automatic robot, in accordance with the present invention.

FIG. 3 shows the manner in which the control system (40) is able to be used for the control of an at least semi-autonomous robot, which is an at least semi-autonomous motor vehicle (100).

For instance, the motor vehicle (100) may include multiple sensors (30) such as sensors (30) of a different type, e.g., LIDAR sensors, camera sensors and/or ultrasonic sensors. The sensors (30) are preferably installed in the vehicle. The first input signals (x) may be understood to be input images in this instance.

It is possible that the machine learning system is designed to identify objects that are detected in the input images (x). The first output signals (y) may thus characterize positions of objects as well as a variance in connection with the position, which may be understood as an uncertainty about the exact position of an object. The context (63), for instance, may include input images (x) from an earlier time for which objects were already detected at previous instants. In this case, the machine learning system (60) may be understood in such a way that it is meant to ascertain an object position in a current input image based on input images from the past and objects detected in these input images.

Alternatively, it is possible that the context includes input images from other sensors (30) of the vehicle. In this case, the machine learning system (60) may be understood to be carrying out a fusion of the sensor signals (S), the result of the fusion including an uncertainty.

The actuator (10), which is preferably situated in the motor vehicle (100), may be a brake, a drive or a steering system of the motor vehicle (100), for instance. The actuation signal (A) is then able to be ascertained so that the actuator or the actuators (10) is/are actuated in such a way, for instance, that the motor vehicle (100) prevents a collision with the objects identified by the machine learning system (60), in particular when objects of certain classes such as pedestrians are involved.

Alternatively or additionally, the actuation signal (A) is able to be used to actuate the display unit (10a) and to display the identified objects, for example. It is also possible that the display unit (10a) is actuated by the actuation signal (A) in such a way that it outputs an optical or acoustic warning signal when it is ascertained that a collision between the motor vehicle (100) and one of the identified objects is imminent. This may also be accomplished via a haptic warning signal such as via a vibrating steering wheel of the motor vehicle (100).

As an alternative, the at least semi-autonomous robot may also involve some other mobile robot (not shown), for instance a robot which moves along by flying, swimming, diving or walking. For example, the mobile robot may also be an at least semi-autonomous lawnmower or an at least semi-autonomous cleaning robot. In these cases, too, the actuation signal (A) is able to be ascertained so that the drive and/or steering system of the mobile robot is/are actuated in such a way, for example, that the at least one semi-autonomous robot prevents a collision with objects identified by the machine learning system (60).

Figure 4:
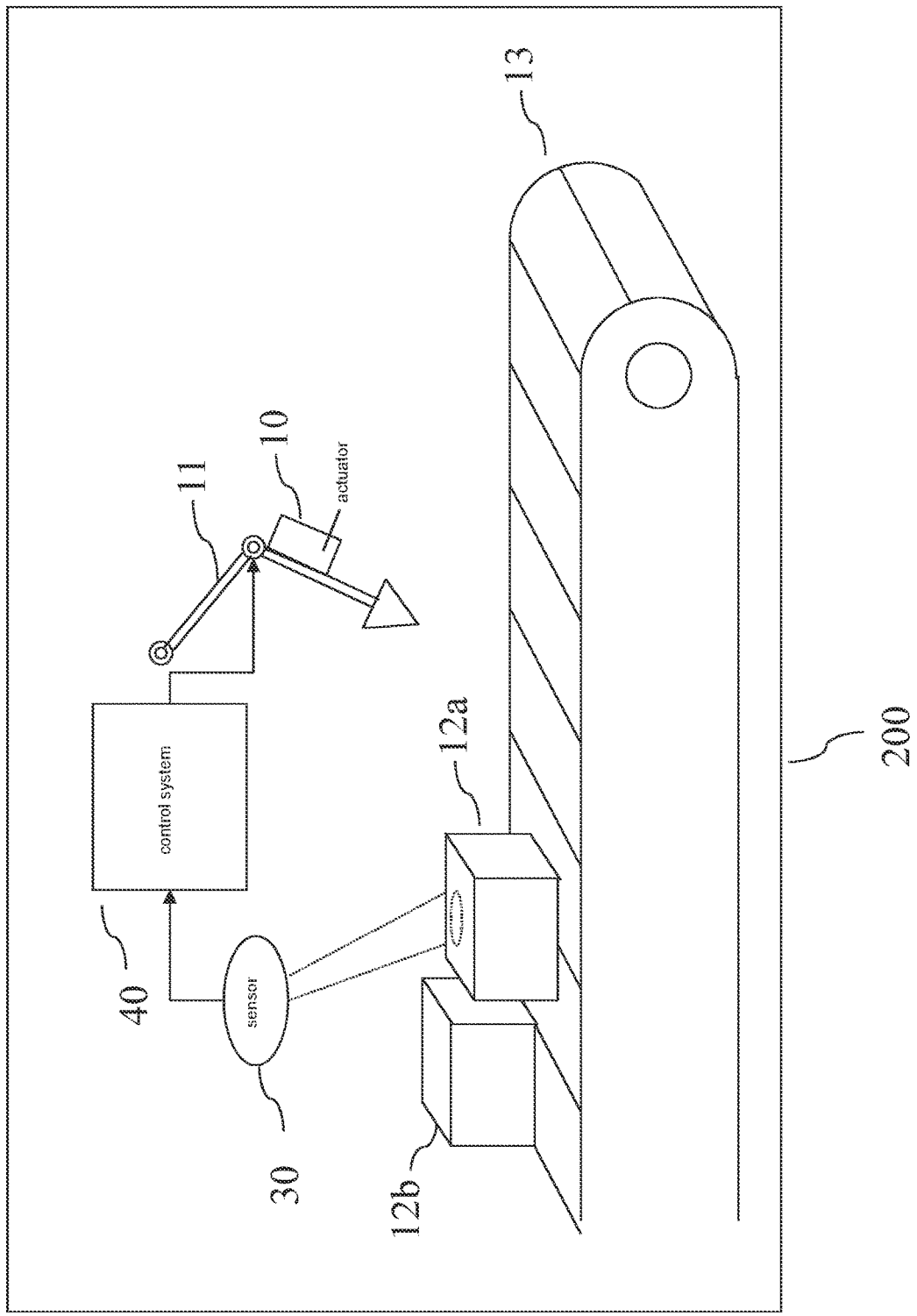
FIG. 4 schematically, an exemplary embodiment for controlling a production system, in accordance with the present invention.

FIG. 4 shows an exemplary embodiment in which the control system (40) is used to actuate a production machine (11) of a production system (200) by actuating an actuator (10) which controls the production machine (11). The production machine (11), for instance, may involve a machine for punching, sawing, drilling and/or cutting. It is furthermore possible that the production machine (11) is developed to grasp manufactured goods (12a, 12b) with the aid of a grasping tool.

The sensor (30), for instance, may be a video sensor, which senses the conveyer surface of a conveyer belt (13), for example, on which manufactured goods (12a, 12b) may be situated. In this case the input signals (x) are input images (x). The machine learning system (60), for instance, may be designed to ascertain a position of the manufactured goods (12a, 12b) on the conveyor belt based on an input signal (x). The actuator (10) controlling the production machine (11) is then able to be actuated as a function of the ascertained positions of the manufactured goods (12a, 12b). For example, the actuator (10) may be actuated in such a way that it punches, saws, drills and/or cuts manufactured goods (12a, 12b) at a predefined location on the manufactured good (12a, 12b).

As context (63), input signals (x) of instants in the past and the respectively ascertained positions of the manufactured goods (12a, 12b) are able to be provided to the machine learning system.

It is furthermore possible that the machine learning system (60) is designed to ascertain further properties of manufactured goods (12a, 12b) in addition or as an alternative to the position. In particular, it is possible that the machine learning system (60) ascertains whether manufactured goods (12a, 12b) are defective and/or damaged. In this case, the actuator (10) is able to be actuated in such a way that the production machine (11) sorts and rejects defective and/or damaged manufactured goods (12a, 12b).

Figure 5:
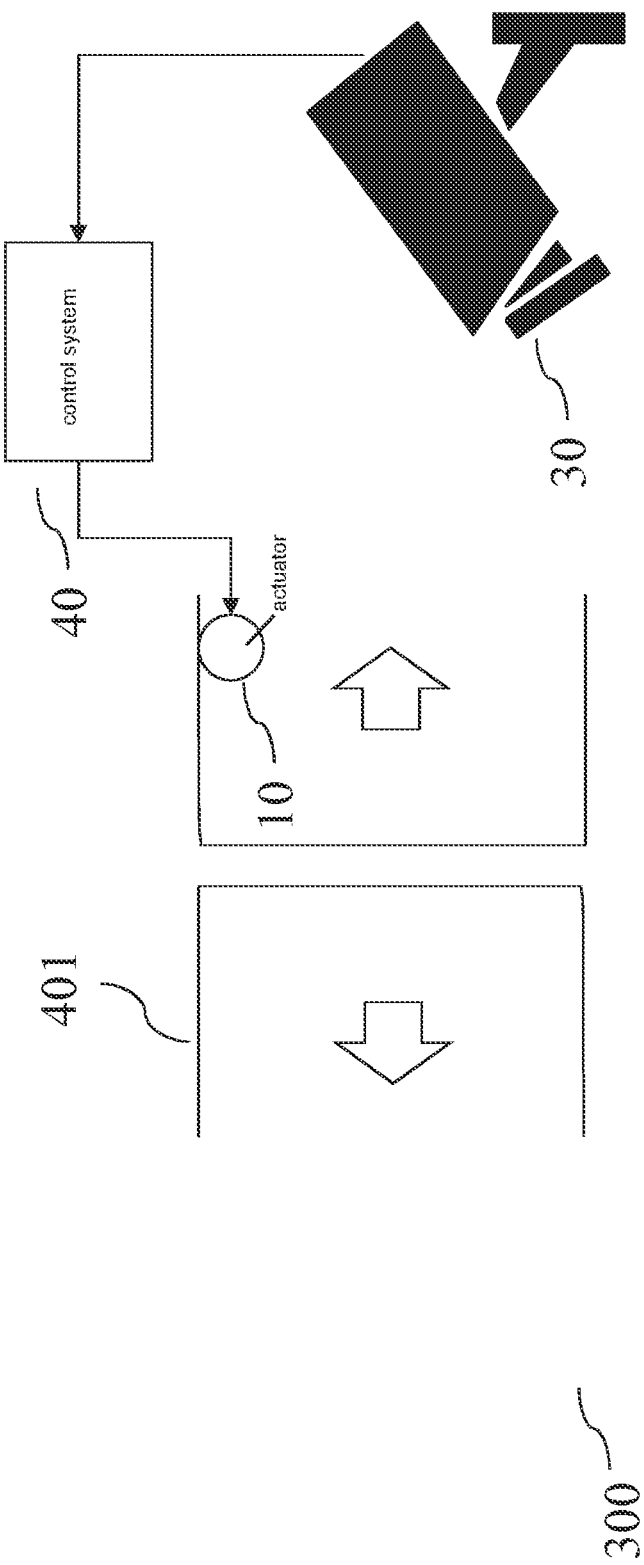
FIG. 5 schematically, an exemplary embodiment for controlling an access system, in accordance with the present invention.

FIG. 5 shows an exemplary embodiment in which the control system (40) is used to control an access system (300). The access system (300) may include a physical access control such as a door (401). More specifically, the sensor (30) could be a video sensor or thermal imaging sensor, which is designed to acquire a region in front of the door (401). Using the machine learning system (60), an acquired image is able to be interpreted. In particular, the machine learning system (60) is capable of detecting persons in an input image (x) it has received. If multiple persons have been detected simultaneously, then an allocation of the persons (i.e. the objects) with respect to one another makes it possible to ascertain the identity of the persons in a particularly reliable manner, for instance by analyzing their movements.

As context (63), input signals (x) from instants in the past and persons detected therein are able to be transmitted to the machine learning system (60) in each case.

The actuator (10) may be a lock which releases or blocks the access control as a function of the actuation signal (A), e.g., opens the door (401) or locks it. To this end, the actuation signal (A) is able to be selected as a function of the output signal (y) for the input image (x) ascertained by the machine learning system (60). For example, it is possible that the output signal (y) includes information that characterizes the identity of a person detected by the machine learning system (60) and the actuation signal (A) is selected on the basis of the identity of the person.

Instead of the physical access control, a logical access control may be provided as well.

Figure 6:
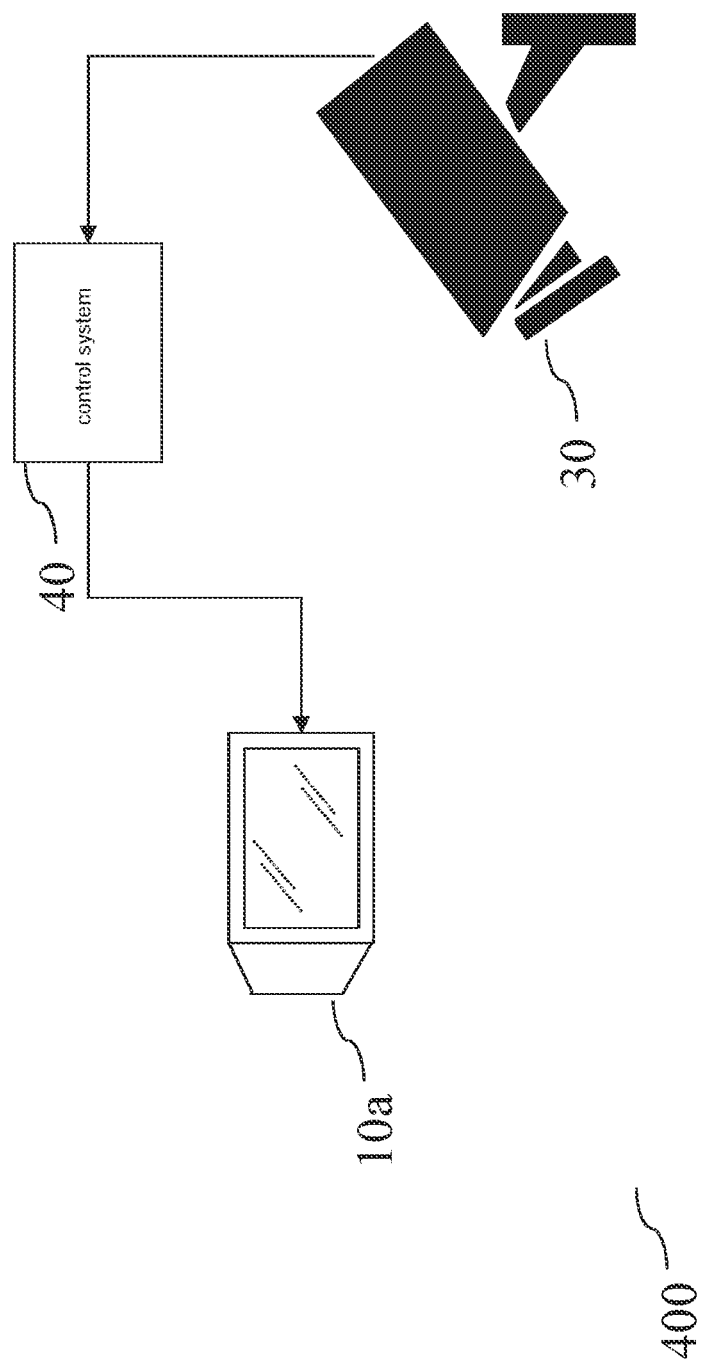
FIG. 6 schematically, an exemplary embodiment for controlling a monitoring system, in accordance with the present invention.

FIG. 6 shows an exemplary embodiment in which the control system (40) is used to control a monitoring system (400). This particular exemplary embodiment differs from the exemplary embodiment shown in FIG. 5 in that it is the display unit (10a) instead of the actuator (10) that is actuated by the control system (40). For instance, the sensor (30) may record an input image (x) in which at least one person can be identified, and the position of the at least one person is able to be detected with the aid of the machine learning system (60). The input image (x) is then able to be displayed on the display unit (10a), the detected persons being able to be displayed in color-coded emphasized form.

Figure 7:
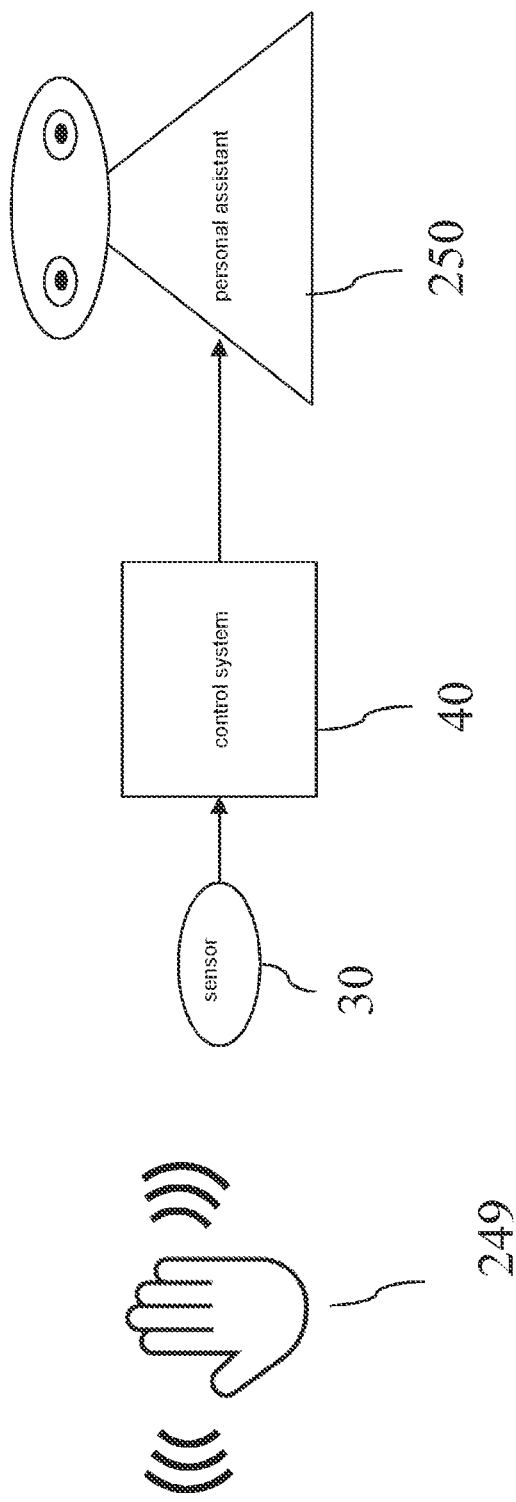
FIG. 7 schematically, an exemplary embodiment for controlling a personal assistant, in accordance with the present invention.

FIG. 7 shows an exemplary embodiment in which the control system (40) is used to control a personal assistant (250). Preferably, the sensor (30) is an optical sensor which receives images of a gesture of a user (249) and, for instance, is a video sensor or a thermal imaging camera.

Depending on the signals from the sensor (30), the control system (40) ascertains an actuation signal (A) of the personal assistant (250), for instance in that the machine learning system (60) carries out a gesture detection. This ascertained actuation signal (A) then is forwarded to the personal assistant (250) and the personal assistant (250) is controlled accordingly. The ascertained actuation signal (A) may particularly be selected in such a way that it corresponds to an assumed desired actuation by the user (249). This assumed desired actuation is able to be ascertained as a function of the gesture recognized by the machine learning system (60). The control system (40) is then able to select the actuation signal (A) for transmittal to the personal assistant (250) as a function of the assumed desired actuation, and/or to select the actuation signal (A) for transmittal to the personal assistant according to the assumed desired actuation (250).

For instance, this corresponding actuation may include that the personal assistant (250) calls up information from a database and reproduces it in a manner that is receivable by the user (249).

Instead of the personal assistant (250), a household appliance (not shown), in particular a washing machine, a stove, an oven, a microwave or a dishwasher, may also be provided for a corresponding actuation.

Instead of a gesture control, it is also possible that the personal assistant (250) is able to be controlled via spoken commands of the user (249). The context (63), for instance, may characterize a sequence of sampling instants and sampling values of an audio signal from an audio sensor (30), the machine learning system (60) being developed to predict further sampling values at further sampling instants. The context and the further sampling instants and the predicted sampling values may then be forwarded to a classifier in each case, which ascertains a classification of a spoken command based on its input.

Figure 8:
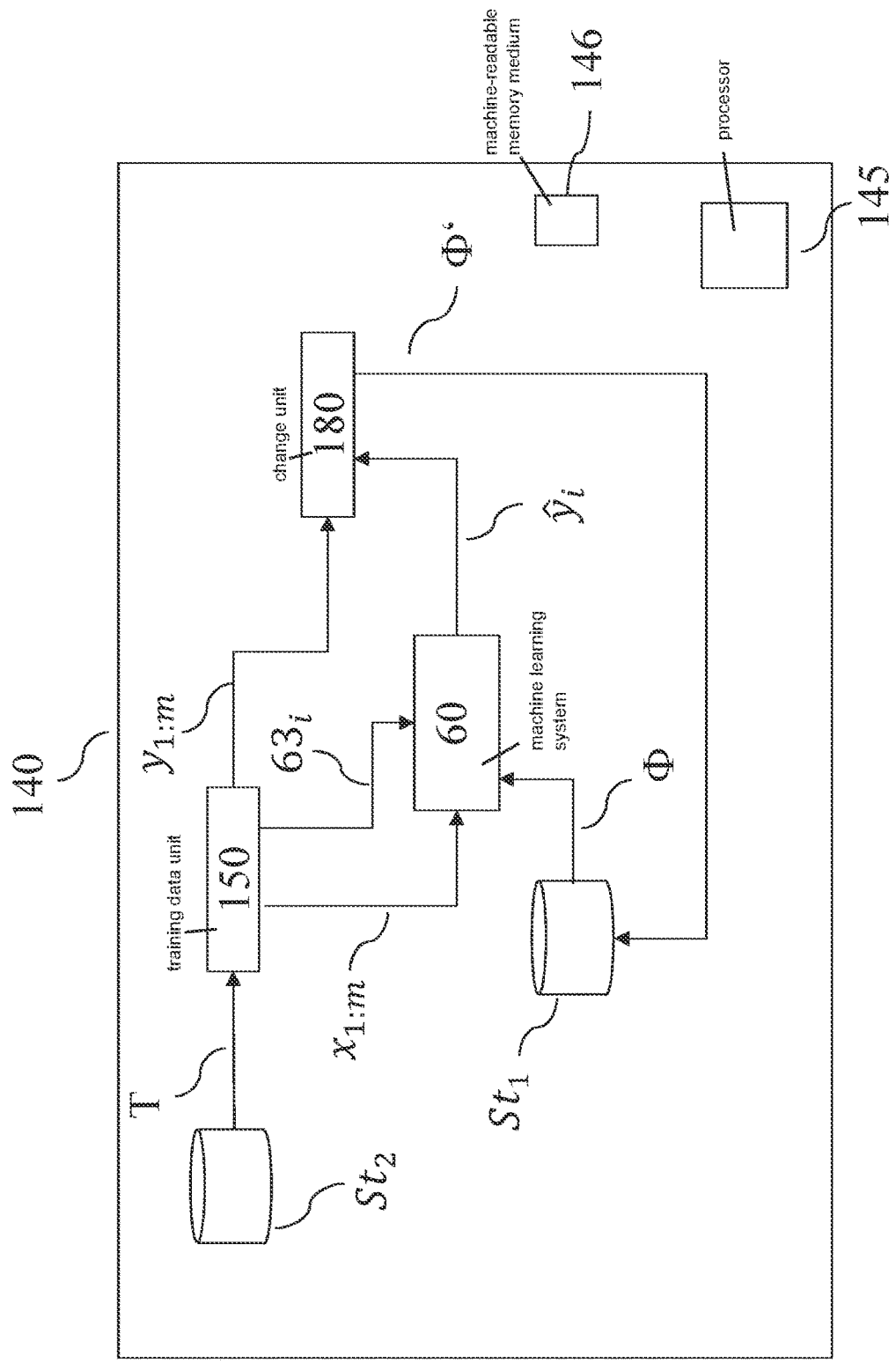
FIG. 8 schematically, an exemplary embodiment of a training system for training the machine learning system, in accordance with an example embodiment of the present invention.

FIG. 8 shows an exemplary embodiment of a training system (140) for training the machine learning system (60) of the control system (40) with the aid of a training dataset (T). The training dataset (T) preferably encompasses a multiplicity of sequences of input signals ($x_i$), which are used for training the machine learning system (60), the training dataset (T) furthermore including a desired output signal ($y_i$) for a respective input signal ($x_i$), which corresponds to the input signal ($x_i$) and characterizes a classification and/or regression of the input signal ($x_i$).

For the training, a training data unit (150) accesses a computer-implemented database ($St_2$), the database ($St_2$) making the training dataset (T) available. From the training dataset (T), the training data unit (150) ascertains, preferably at random, at least one sequence of input signals and corresponding desired output signals. Next, the training data unit (150) divides the first input signals of the sequence, preferably into a first multiplicity of input signals ($x_i$) and a second multiplicity of input signals ($63_i$). As an alternative, it is also possible that the sequence is separated at a predefined point in order to ascertain the first multiplicity ($x_i$) and the second multiplicity ($63_i$).

The input signals of the second multiplicity ($63_i$) and the output signals corresponding to the input signals are made available as context to the machine learning system (60), while the input signals of the first multiplicity ($x_i$) as first input signals are made available to the machine learning system (60). Based on these inputs, the machine learning system (60) ascertains a corresponding output signal ($\hat{y}_i$) for each input signal of the first multiplicity ($x_i$). After the ascertainment, an ascertained output signal ($\hat{y}_i$) and a desired output signal ($y_i$) therefore exist for each input signal of the first multiplicity ($x_i$).

The desired output signal ($y_i$) and the ascertained output signal ($\hat{y}_i$) are transmitted to a change unit (180).

Based on the desired output signal ($y_i$) and the ascertained output signal ($\hat{y}_i$), the change unit (180) then ascertains new parameters ($\Phi'$) for the machine learning system (60). For this purpose, the change unit (180) compares the desired output signal ($y_i$) and the ascertained output signal ($\hat{y}_i$) with the aid of a loss function. The loss function ascertains a first loss value, which characterizes the extent to which the ascertained output signal ($\hat{y}_i$) deviates from the desired output signal ($y_i$).

The loss function preferably ascertains the loss value according to the formula $$l(y_{1:m} \mid x_{1:m}, \mu_z, \sigma_z^2) = -\sum_i \mathcal{N}(y_i \mid dec(x_i, \mu_z), dec(x_i, \sigma_z^2)),$$

where $x_{1:m}$ is the first multiplicity of input signals, $y_{1:m}$ characterizes the output signals of the first multiplicity of input signals, $\mathcal{N}$ is a probability density function of a normal distribution, $dec(x_i, \mu_z)$ is a first output of the decoder (62) for an input signal $x_i$ of the first multiplicity and a third representation $\mu_z$ of the latent representation, $dec(x_i, \sigma_z^2)$ is a second output of the decoder (62) for the input signal $x_i$ and a fourth representation $\sigma_z^2$ of the latent representation, the first output being used as an expected value of the probability density function and the second output being used as a variance or a covariance matrix of the probability density function. The third representation ($\mu_z$) and the fourth representation ($\sigma_z^2$) of the latent representation are ascertained with the aid of the encoder (61) of the machine learning system (60) and based on the second multiplicity ($63_i$).

The change unit (180) ascertains the new parameters ($\Phi'$) on the basis of the first loss value. In the exemplary embodiment, this is accomplished with the aid of a gradient descent method, preferably the stochastic gradient descent, Adam, or AdamW.

The ascertained new parameters ($\Phi'$) are stored in a model parameter memory ($St_1$). The ascertained new parameters ($\Phi'$) are preferably made available to the machine learning system (60) as parameters ($\Phi$).

In further preferred exemplary embodiments, the described training is iteratively repeated for a predefined number of iteration steps or iteratively repeated until the first loss value drops below a predefined threshold value. Alternatively or additionally, it is also possible that the training is ended when an average first loss value with regard to a test or validation dataset drops below a predefined threshold value. In at least one of the iterations, the new parameters ($\Phi'$) determined in a previous iteration are used as parameters ($\Phi$) of the machine learning system (60).

In addition, the training system (140) may include at least one processor (145) and at least one machine-readable memory medium (146), which includes instructions that induce the training system (140) to carry out a training method as recited in one of the aspects of the present invention when the instructions are executed by the processor (145).

The term 'computer' encompasses all kinds of devices for the processing of predefinable computing rules. These computing rules may be present in the form of software or in the form of hardware or also in a mixed form of software and hardware.

In general, a multiplicity may be understood as being indexed, that is to say, a unique index is allocated to each element of the multiplicity, preferably by allocating consecutive whole numbers to the elements encompassed by the multiplicity. When a multiplicity includes N elements, N being the number of elements in the multiplicity, the whole numbers from 1 to N are preferably allocated to the elements.

What is claimed is:

1. A computer-implemented method for ascertaining a first output signal using a machine learning system, the first output signal characterizing a classification and/or a regression of a first input signal, and the first output signal includes a first representation which characterizes an expected value of the classification and/or the regression, and includes a second representation, which characterizes a variance of the classification and/or the regression, the method for ascertaining including the following steps:
  ascertaining a multiplicity of latent representations using an encoder of the machine learning system, each latent representation of the multiplicity of latent representations being ascertained based on at least one second input signal and a second output signal that corresponds to the second input signal, and the second input signal and the second output signal characterize a context of the first input signal, and the latent representation includes a first representation and a second representation, the first representation characterizing an expected value and the second representation characterizing a variance;
  ascertaining a third representation based on the first representations of the latent representations of the multiplicity of latent representations, and the third representation characterizes an accumulation of the first representations;
  ascertaining a fourth representation based on the second representations of the latent representations of the multiplicity of latent representations, the fourth representation characterizing an accumulation of the second representations; and
  ascertaining the first output signal using a decoder of the machine learning system, the decoder ascertaining the first output signal based on the third representation and the fourth representation and the first input signal, wherein the method for ascertaining the first output signal includes training of the machine learning system, the training including the following steps:
  ascertaining a multiplicity of training input signals, which are in context with one another, a corresponding training output signal being allocated to each training input signal;
  dividing the multiplicity of training input signals and the training output signals into a multiplicity of second training input signals and corresponding second training output signals and into at least one first training input signal and a corresponding first training output signal;
  ascertaining a third representation and a fourth representation based on the multiplicity of second training input signals and the second training output signals;
  ascertaining a predicted output signal for the at least one first training input signal using the decoder of the machine learning system and based on the ascertained third representation and the ascertained fourth representation and the first training input signal;
  ascertaining a loss value which characterizes a difference between the predicted output signal and the first training output signal;
  ascertaining a gradient of a multiplicity of parameters of the encoder and/or the decoder with regard to the loss value; and
  varying the multiplicity of parameters based on the ascertained gradient.

2. The method as recited in claim 1, wherein the fourth representation $\sigma_z^2$ is ascertained according to the formula $$\sigma_z^2 = \left[ (\sigma_0^2)^\ominus + \sum_i (\sigma_i^2)^\ominus \right]^\ominus$$

where $\sigma_0^2$ is an a priori assumption about the fourth representation $\sigma_z^2$, $\sigma_i^2$ is a second representation, ascertained by the encoder, of the latent representation of the $i^{th}$ input signal and the $i^{th}$ output signal of the multiplicity of second input signals and second output signals, and $\ominus$ indicating an elementwise reciprocal value.

3. The method as recited in claim 1, wherein the third representation $\mu_z$ is ascertained according to the formula $$\mu_z = \mu_0 + \sigma_z^2 \odot \sum_i (\mu_i - \mu_0) \oslash (\sigma_i^2)$$

where $\mu_0$ is an a priori assumption about the third representation $\mu_z$, $\mu_i$ is the first representation, ascertained by the encoder, of the latent representation of the $i^{th}$ input signal and the $i^{th}$ output signal of the multiplicity of second input signals and second output signals, $\sigma_z^2$ is the fourth representation, $\sigma_i^2$ is the second representation, ascertained by the encoder, of a latent representation of the $i^{th}$ input signal and the $i^{th}$ output signal of the multiplicity of second input signals and second output signals, $\odot$ indicates an elementwise multiplication, and $\oslash$ indicates an elementwise division.

4. The method as recited in claim 1, wherein the encoder includes a neural network which is configured to ascertain the first representations and the second representations of the latent representations based on the multiplicity of second input signals and second output signals.

5. The method as recited in claim 1, wherein the encoder includes a first neural network which is designed to ascertain the first representations of the latent representations based on the multiplicity of second input signals and the second output signals, and the encoder includes a second neural network which is configured to ascertain the second representations of the latent representations based on the multiplicity of the second input signals and the second output signals.

6. The method as recited in claim 1, wherein the decoder includes a neural network which is configured to ascertain the first output signal, based on the third representation and the fourth representation and the first input signal.

7. The method as recited in claim 1, wherein the decoder includes a first neural network which is configured to ascertain the first representation of the first output signal based on the third representation and the first input signal, and the decoder includes a second neural network which is configured to ascertain the second representation of the first output signal based on the fourth representation and the first input signal.

8. The method as recited in claim 1, wherein the loss value is ascertained based on a loss function, the loss function characterizing a probability density function or a logarithmized probability density function of a normal distribution, and a first representation of the predicted output signal ascertained by the decoder is used as the expected value of the probability density function, and a second representation of the predicted output signal ascertained by the decoder is used as a variance or a covariance matrix of the probability density function.

9. The method as recited in claim 8, wherein the machine learning system is trained using a multiplicity of the first training input signals and the training output signals, the loss value being ascertained according to the formula $$l(y_{1:m} \mid x_{1:m}, \mu_z, \sigma_z^2) = -\sum_i \mathcal{N}(y_i \mid dec(x_i, \mu_z), dec(x_i, \sigma_z^2))$$

where $x_{1:m}$ is the multiplicity of first training input signals, $y_{1:m}$ are the training output signals allocated to the first training input signals in each case, $\mathcal{N}$ is a probability density function of a normal distribution, $dec(x_i, \mu_z)$ is a first representation of the predicted output signal ascertained using the decoder, $dec(x_i, \sigma_z^2)$ is a second representation of the predicted output signal ascertained using the decoder, the ascertained first representation being used as an expected value of the probability density function, and the ascertained second representation being used as a variance or a covariance matrix of the probability density function.

10. The method as recited in claim 1, wherein a device is operated according to the first output signal.

11. A machine learning system configured to ascertain a first output signal, the first output signal characterizing a classification and/or a regression of a first input signal, and the first output signal includes a first representation which characterizes an expected value of the classification and/or the regression, and includes a second representation, which characterizes a variance of the classification and/or the regression, the machine learning system configured to:
  ascertain a multiplicity of latent representations using an encoder of the machine learning system, each latent representation of the multiplicity of latent representations being ascertained based on at least one second input signal and a second output signal that corresponds to the second input signal, and the second input signal and the second output signal characterize a context of the first input signal, and the latent representation includes a first representation and a second representation, the first representation characterizing an expected value and the second representation characterizing a variance;
  ascertain a third representation based on the first representations of the latent representations of the multiplicity of latent representations, and the third representation characterizes an accumulation of the first representations;
  ascertain a fourth representation based on the second representations of the latent representations of the multiplicity of latent representations, the fourth representation characterizing an accumulation of the second representations; and
  ascertain the first output signal using a decoder of the machine learning system, the decoder ascertaining the first output signal based on the third representation and the fourth representation and the first input signal, wherein the method for ascertaining the first output signal includes training of the machine learning system, the training including the following steps:
  ascertaining a multiplicity of training input signals, which are in context with one another, a corresponding training output signal being allocated to each training input signal;
  dividing the multiplicity of training input signals and the training output signals into a multiplicity of second training input signals and corresponding second training output signals and into at least one first training input signal and a corresponding first training output signal;
  ascertaining a third representation and a fourth representation based on the multiplicity of second training input signals and the second training output signals;
  ascertaining a predicted output signal for the at least one first training input signal using the decoder of the machine learning system and based on the ascertained third representation and the ascertained fourth representation and the first training input signal;
  ascertaining a loss value which characterizes a difference between the predicted output signal and the first training output signal;
  ascertaining a gradient of a multiplicity of parameters of the encoder and/or the decoder with regard to the loss value; and
  varying the multiplicity of parameters based on the ascertained gradient.

12. A training device configured to train a machine learning system, the machine learning system configured to ascertain a first output signal, the first output signal characterizing a classification and/or a regression of a first input signal, and the first output signal includes a first representation which characterizes an expected value of the classification and/or the regression, and includes a second representation, which characterizes a variance of the classification and/or the regression, the machine learning system configured to:
  ascertain a multiplicity of latent representations using an encoder of the machine learning system, each latent representation of the multiplicity of latent representations being ascertained based on at least one second input signal and a second output signal that corresponds to the second input signal, and the second input signal and the second output signal characterize a context of the first input signal, and the latent representation includes a first representation and a second representation, the first representation characterizing an expected value and the second representation characterizing a variance;
  ascertain a third representation based on the first representations of the latent representations of the multiplicity of latent representations, and the third representation characterizes an accumulation of the first representations;
  ascertain a fourth representation based on the second representations of the latent representations of the multiplicity of latent representations, the fourth representation characterizing an accumulation of the second representations; and
  ascertain the first output signal using a decoder of the machine learning system, the decoder ascertaining the first output signal based on the third representation and the fourth representation and the first input signal;
the training device configured to:
  ascertain a multiplicity of training input signals, which are in context with one another, a corresponding training output signal being allocated to each training input signal;
  divide the multiplicity of training input signals and the training output signals into a multiplicity of second training input signals and corresponding second training output signals and into at least one first training input signal and a corresponding first training output signal;

ascertain a third representation and a fourth representation based on the multiplicity of second training input signals and the second training output signals;

ascertain a predicted output signal for the at least one first training input signal using a decoder of the machine learning system and based on the ascertained third representation and the ascertained fourth representation and the first training input signal;

ascertain a loss value which characterizes a difference between the predicted output signal and the first training output signal;

ascertain a gradient of a multiplicity of parameters of the encoder and/or the decoder with regard to the loss value; and vary the multiplicity of parameters based on the ascertained gradient.

13. A non-transitory machine-readable memory medium on which is stored a computer program for ascertaining a first output signal using a machine learning system, the first output signal characterizing a classification and/or a regression of a first input signal, and the first output signal includes a first representation which characterizes an expected value of the classification and/or the regression, and includes a second representation, which characterizes a variance of the classification and/or the regression, the computer program, when executed by a processor, causing the processor to perform the following steps:

ascertaining a multiplicity of latent representations using an encoder of the machine learning system, each latent representation of the multiplicity of latent representations being ascertained based on at least one second input signal and a second output signal that corresponds to the second input signal, and the second input signal and the second output signal characterize a context of the first input signal, and the latent representation includes a first representation and a second representation, the first representation characterizing an expected value and the second representation characterizing a variance;

ascertaining a third representation based on the first representations of the latent representations of the multiplicity of latent representations, and the third representation characterizes an accumulation of the first representations;

ascertaining a fourth representation based on the second representations of the latent representations of the multiplicity of latent representations, the fourth representation characterizing an accumulation of the second representations; and ascertaining the first output signal using a decoder of the machine learning system, the decoder ascertaining the first output signal based on the third representation and the fourth representation and the first input signal, wherein the method for ascertaining the first output signal includes training of the machine learning system, the training including the following steps:

ascertaining a multiplicity of training input signals, which are in context with one another, a corresponding training output signal being allocated to each training input signal;

dividing the multiplicity of training input signals and the training output signals into a multiplicity of second training input signals and corresponding second training output signals and into at least one first training input signal and a corresponding first training output signal;

ascertaining a third representation and a fourth representation based on the multiplicity of second training input signals and the second training output signals;

ascertaining a predicted output signal for the at least one first training input signal using the decoder of the machine learning system and based on the ascertained third representation and the ascertained fourth representation and the first training input signal;

ascertaining a loss value which characterizes a difference between the predicted output signal and the first training output signal;

ascertaining a gradient of a multiplicity of parameters of the encoder and/or the decoder with regard to the loss value; and varying the multiplicity of parameters based on the ascertained gradient.

* * * * *